United States Patent
Kalman et al.

(10) Patent No.: US 10,855,556 B2
(45) Date of Patent: Dec. 1, 2020

(54) METHODS FOR FACILITATING ADAPTIVE QUALITY OF SERVICE IN STORAGE NETWORKS AND DEVICES THEREOF

(71) Applicant: NetApp, Inc., Sunnyvale, CA (US)

(72) Inventors: Dean Kalman, Cary, NC (US); Ashwin Palani, Cary, NC (US)

(73) Assignee: NetApp, Inc., Sunnyvale, CA (US)

(*) Notice: Subject to any disclaimer, the term of this patent is extended or adjusted under 35 U.S.C. 154(b) by 63 days.

(21) Appl. No.: 16/192,145

(22) Filed: Nov. 15, 2018

(65) Prior Publication Data
US 2020/0036604 A1    Jan. 30, 2020

Related U.S. Application Data

(60) Provisional application No. 62/703,381, filed on Jul. 25, 2018.

(51) Int. Cl.
*G06F 15/173* (2006.01)
*H04L 12/24* (2006.01)
(Continued)

(52) U.S. Cl.
CPC .......... *H04L 41/5025* (2013.01); *G06F 3/061* (2013.01); *G06F 3/067* (2013.01);
(Continued)

(58) Field of Classification Search
CPC ............. H04L 41/5025; H04L 41/0893; H04L 43/0882; G06F 3/061; G06F 3/0653; G06F 3/067; G06F 11/3433; G06F 11/3485
(Continued)

(56) References Cited

U.S. PATENT DOCUMENTS 6,990,667 B2  1/2006 Ulrich et al.
8,055,291 B2  11/2011 Haartsen et al.
(Continued)

FOREIGN PATENT DOCUMENTS

| CN | 103813213 A | 5/2014 |
|---|---|---|
| EP | 1851980 B1 | 7/2014 |
| WO | 2017123776 A1 | 7/2017 |

OTHER PUBLICATIONS

"Performance Management Power Guide", Jun. 2018, 40 pages, NetApp, Inc.
(Continued)

*Primary Examiner* — Imad Hussain
(74) *Attorney, Agent, or Firm* — Troutman Pepper Hamilton Sanders LLP (Rochester)

(57) ABSTRACT

Methods, non-transitory machine readable media, and computing devices that assign a quality of service (QoS) policy to an instantiated storage object. The assigned QoS policy includes a throughput parameter including a number of input/output (I/O) operations per second (IOPS) based on a storage operation block size. Storage operations are executed with the storage object according to the throughput parameter. Metadata is monitored including a size attribute of the storage object. The QoS policy is then automatically modified to adjust the throughput parameter based on the size attribute. This technology configures, manages, and scales performance provided to storage objects based on a monitored used or allocated size of the storage objects. Accordingly, this technology provides more performance for applications as storage object space is increasingly consumed by the applications, thereby improving the functionality and efficiency of storage nodes or controllers that are executing storage operations and managing I/O in storage networks.

20 Claims, 4 Drawing Sheets

(51) Int. Cl.
*G06F 3/06* (2006.01)
*G06F 11/34* (2006.01)
*H04L 12/26* (2006.01)

(52) U.S. Cl.
CPC ........ *G06F 3/0653* (2013.01); *G06F 11/3433* (2013.01); *G06F 11/3485* (2013.01); *H04L 41/0893* (2013.01); *H04L 43/0882* (2013.01)

(58) Field of Classification Search
USPC .......................................................... 709/224
See application file for complete search history.

(56) References Cited

U.S. PATENT DOCUMENTS

| | | | |
|---|---|---|---|
| 8,370,294 B2 | 2/2013 | Lyakhovitskiy | |
| 8,479,211 B1 | 7/2013 | Marshall et al. | |
| 8,656,088 B2* | 2/2014 | Belluomini | G06F 12/0888 |
| | | | 711/103 |
| 8,775,549 B1* | 7/2014 | Taylor | H04L 67/1097 |
| | | | 709/217 |
| 8,843,169 B2 | 9/2014 | Navda et al. | |
| 9,201,677 B2 | 12/2015 | Joshi et al. | |
| 9,658,785 B2 | 5/2017 | Brooker et al. | |
| 9,747,044 B2 | 8/2017 | Nanduri et al. | |
| 9,843,536 B2 | 12/2017 | Miller | |
| 9,860,317 B1 | 1/2018 | Gupta | |
| 9,880,786 B1 | 1/2018 | Brown | |
| 9,910,613 B2* | 3/2018 | Rao | G06F 3/065 |
| 9,992,118 B2 | 6/2018 | Jia et al. | |
| 10,025,718 B1* | 7/2018 | Wasiq | G06F 12/0866 |
| 10,032,115 B2 | 7/2018 | Klingenberg et al. | |
| 10,102,230 B1* | 10/2018 | Muniswamy Reddy | |
| | | | G06F 16/2228 |
| 10,171,572 B2* | 1/2019 | Granshaw | H04L 43/0876 |
| 10,313,251 B2* | 6/2019 | Kalman | H04L 43/0888 |
| 10,379,771 B1* | 8/2019 | Wu | G06F 3/061 |
| 10,528,682 B2* | 1/2020 | Kumar | G06F 30/33 |
| 2004/0025162 A1 | 2/2004 | Fisk | |
| 2004/0257985 A1* | 12/2004 | Sahai | H04L 47/29 |
| | | | 370/229 |
| 2005/0063391 A1* | 3/2005 | Pedersen | H04L 49/351 |
| | | | 370/395.21 |
| 2007/0083482 A1* | 4/2007 | Rathi | G06F 16/182 |
| 2012/0236713 A1* | 9/2012 | Kakadia | H04L 47/2458 |
| | | | 370/230 |
| 2012/0297113 A1* | 11/2012 | Belluomini | G06F 12/0888 |
| | | | 711/103 |
| 2013/0283073 A1* | 10/2013 | Jeganathan | G06F 1/3234 |
| | | | 713/320 |
| 2014/0040498 A1* | 2/2014 | Oyman | H04W 76/10 |
| | | | 709/231 |
| 2015/0113223 A1* | 4/2015 | Brown | G06F 12/0238 |
| | | | 711/133 |
| 2016/0366223 A1* | 12/2016 | Mason | H04L 41/0816 |
| 2017/0083251 A1* | 3/2017 | Karale | G06F 3/0619 |
| 2017/0177899 A1 | 6/2017 | Ng et al. | |
| 2017/0222935 A1* | 8/2017 | Kalman | H04L 41/0893 |
| 2018/0196608 A1* | 7/2018 | Ahmed | G06F 3/061 |
| 2018/0240163 A1* | 8/2018 | Sivasubramanian | |
| | | | H04M 15/882 |
| 2018/0324108 A1* | 11/2018 | Avraham | H04L 41/5003 |
| 2019/0245794 A1* | 8/2019 | Kalman | H04L 43/0888 |
| 2019/0306255 A1* | 10/2019 | Xiao | H04L 67/16 |

OTHER PUBLICATIONS

Sammer, "NetApp SolidFire Quality of Service (QoS)", Technical Report, Oct. 2017, 20 pages, NetApp, Inc.

* cited by examiner

METHODS FOR FACILITATING ADAPTIVE QUALITY OF SERVICE IN STORAGE NETWORKS AND DEVICES THEREOF

This application claims the benefit of U.S. Provisional Patent Application Ser. No. 62/703,381, filed Jul. 25, 2018, which is hereby incorporated by reference in its entirety.

FIELD

This technology generally relates to data storage networks and, more particularly, to methods and devices for facilitating adaptive quality of service (QoS) in storage networks to improve performance.

BACKGROUND

Storage networks are increasingly utilized by applications to store large amounts of data for enterprises. Quality of service (QoS) for applications in storage networks is generally based on a static configuration with fixed performance (e.g., a particular number of input/output operations per second (IOPS)) irrespective of storage usage or capacity. However, some applications are negatively impacted by a static QoS policy, particularly over time as they consume more storage space. Additionally, storage providers offering storage as a service (e.g., hyperscalers) are limited in the performance tiers that can be offered and leveraged based on static QoS policies.

DETAILED DESCRIPTION

Figure 1:
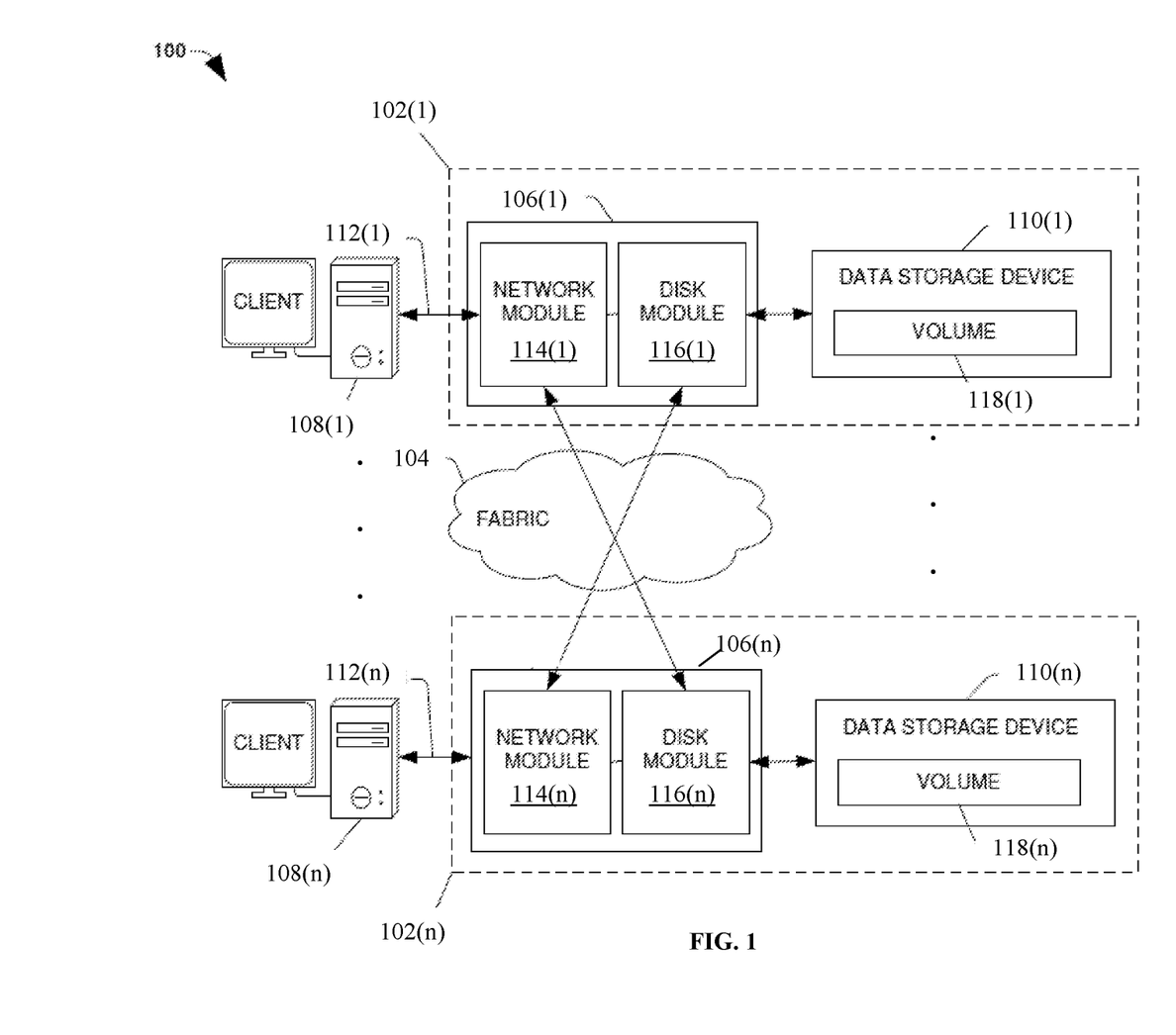
FIG. 1 is a block diagram of a network environment with an exemplary node computing device.

A clustered network environment 100 that may implement one or more aspects of the technology described and illustrated herein is shown in FIG. 1. The clustered network environment 100 includes data storage apparatuses 102(1)-102(n) that are coupled over a cluster fabric 104 facilitating communication between the data storage apparatuses 102(1)-102(n) (and one or more modules, components, etc. therein, such as, node computing devices 106(1)-106(n), for example), although any number of other elements or components can also be included in the clustered network environment 100 in other examples. This technology provides a number of advantages including methods, non-transitory computer readable media, and computing devices that facilitate adaptive quality of service (QoS) for storage objects, based on the capacity or utilization of the storage objects, to improve performance.

In this example, node computing devices 106(1)-106(n) can be primary or local storage controllers or secondary or remote storage controllers that provide client devices 108(1)-108(n) with access to data stored within data storage devices 110(1)-110(n). The data storage apparatuses 102(1)-102(n) and/or node computing devices 106(1)-106(n) of the examples described and illustrated herein are not limited to any particular geographic areas and can be clustered locally and/or remotely, or not clustered in other examples. Thus, in one example the data storage apparatuses 102(1)-102(n) and/or node computing device 106(1)-106(n) can be distributed over a plurality of storage systems located in a plurality of geographic locations; while in another example a clustered network can include data storage apparatuses 102(1)-102(n) and/or node computing device 106(1)-106(n) residing in a same geographic location (e.g., in a single onsite rack).

In the illustrated example, one or more of the client devices 108(1)-108(n), which may be, for example, personal computers (PCs), computing devices used for storage (e.g., storage servers), or other computers or peripheral devices, are coupled to the respective data storage apparatuses 102(1)-102(n) by network connections 112(1)-112(n). Network connections 112(1)-112(n) may include a local area network (LAN) or wide area network (WAN), for example, that utilize Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 108(1)-108(n) may be general-purpose computers running applications and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage controller configured to process I/O commands issued by the client devices 108(1)-108(n)), and the data storage apparatuses 102(1)-102(n) may return results of the request to the client devices 108(1)-108(n) via the network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within a data cloud), etc., for example. Such node computing devices 106(1)-106(n) can be attached to the fabric 104 at a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 112(n) with switchover data access to storage devices 110(n) in the event a disaster occurs at the second storage site). In other examples, the node computing device 106(n) can be configured according to an archival configuration and/or the node computing devices 106(1)-106(n) can be configured based on another type of replication arrangement (e.g., to facilitate load sharing). Additionally, while two node computing devices are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to access data stored in the clustered network environment 100.

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n). The cluster fabric 104 can include one or more local and/or wide area computing networks embodied as Infiniband, Fibre Channel (FC), or Ethernet networks, for example, although other types of networks supporting other protocols can also be used.

Disk modules 116(1)-116(n) can be configured to connect data storage devices 110(1)-110(2), such as disks or arrays of disks, SSDs, flash memory, or some other form of data storage, to the node computing devices 106(1)-106(n). Often, disk modules 116(1)-116(n) communicate with the data storage devices 110(1)-110(n) according to the SAN protocol, such as SCSI or FCP, for example, although other protocols can also be used. Thus, as seen from an operating system on node computing devices 106(1)-106(n), the data storage devices 110(1)-110(n) can appear as locally attached. In this manner, different node computing devices 106(1)-106(n), etc. may access data blocks, files, or objects through the operating system, rather than expressly requesting abstract files.

While the clustered network environment 100 illustrates an equal number of network modules 114(1)-114(2) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 118(1)-118(n) in this example, although any number of volumes can be included in the aggregates. The volumes 118(1)-118(n) are virtual data stores or storage objects that define an arrangement of storage and one or more filesystems within the clustered network environment 100. Volumes 118(1)-118(n) can span a portion of a disk or other storage device, a collection of disks, or portions of disks, for example, and typically define an overall logical arrangement of data storage. In one example volumes 118(1)-118(n) can include stored user data as one or more files, blocks, or objects that reside in a hierarchical directory structure within the volumes 118(1)-118(n). Volumes 118(1)-118(n) are typically configured in formats that may be associated with particular storage systems, and respective volume formats typically comprise features that provide functionality to the volumes 118(1)-118(n), such as providing the ability for volumes 118(1)-118(n) to form clusters and perform deduplication, among other functionality.

In one example, to facilitate access to data stored on the disks or other structures of the data storage devices 110(1)-110(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 110(1)-110(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
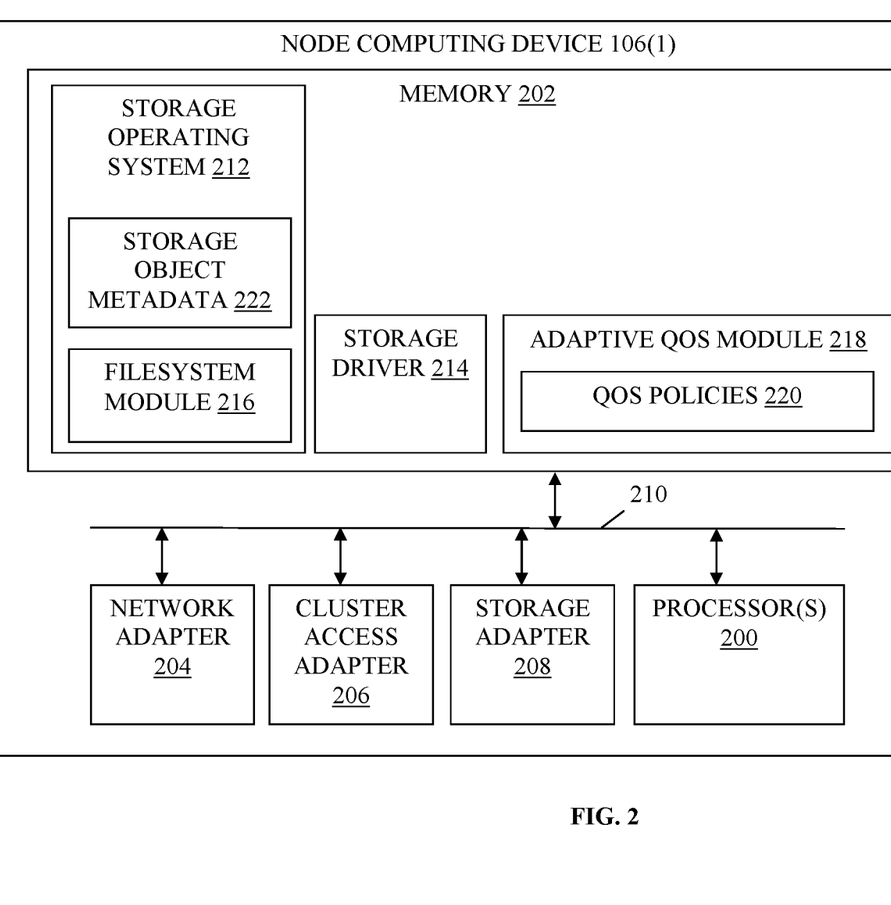
FIG. 2 is a block diagram of the exemplary node computing device of FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a RAID data loss protection and recovery scheme to optimize reconstruction of data of a failed disk or drive in an array. In some examples, the node computing device 106(n) is substantially the same in structure and/or operation as node computing device 106(1), although the node computing device 106(n) can also include a different structure and/or operation in one or more aspects than the node computing device 106(1).

The network adapter 204 in this example includes the mechanical, electrical and signaling circuitry needed to connect the node computing device 106(1) to one or more of the client devices 108(1)-108(n) over network connections 112(1)-112(n), which may comprise, among other things, a point-to-point connection or a shared medium, such as a local area network. In some examples, the network adapter 204 further communicates (e.g., using TCP/IP) via the fabric 104 and/or another network (e.g. a WAN) (not shown) with cloud storage devices to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, flash memory, and/or any other similar media adapted to store information.

In the exemplary data storage devices 110(1)-110(n), information can be stored in data blocks on disks. The storage adapter 208 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(2) and/or sent to another node computing device attached via the cluster fabric 104. In some examples, a storage driver 214 in the memory 202 interfaces with the storage adapter to facilitate interactions with the data storage devices 110(1)-110(n).

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) (e.g., or additional clustered devices) in accordance with the client device requests.

The file system module 216 of the storage operating system 212 can establish and manage one or more filesystems including software code and data structures that implement a persistent hierarchical namespace of files and directories, for example. As an example, when a new data storage device (not shown) is added to a clustered network system, the file system module 216 is informed where, in an existing directory tree, new files associated with the new data storage device are to be stored. This is often referred to as "mounting" a filesystem.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

In this particular example, the memory 202 further includes an adaptive QoS module 218, which is configured to monitor the storage object metadata 222 and adjust the QoS policies 220 based on the monitored metadata. In particular, in some examples, the adaptive QoS module 218 retrieves a size attribute of a storage object (e.g., a volume, LUN, file, or a non-volatile memory express (NVMe) namespace) from the storage object metadata 222, such as a utilization of the storage object (also referred to herein as used space) or an allocated capacity of the storage object (also referred to herein as allocated space), for example. The used space in this example is from a client perspective and does not include storage efficiencies (e.g., deduplication), although other types of used space and size attributes can also be used in other examples. The adaptive QoS module 218 then automatically modifies a throughput parameter (e.g., a number of input/output (I/O) operations per second (IOPS)) of one of the QoS policies 220 associated with the storage object based on the retrieved size attribute in the storage object metadata 222.

The modification can be based on a set of rules internal or external to the one of the QoS policies 220 associated with the storage object. Accordingly, the QoS policies 220 establish the performance, such as the number of IOPS for a particular block size, available for execution of storage operations from the client devices 108(1)-108(n) (e.g., for particular applications). The storage object metadata 222 can be managed by the storage operating system 212 and can be contained in inodes for particular storage objects. In some examples, the storage object metadata, or relevant portion(s) thereof, can be cached in the memory 202 to facilitate more efficient monitoring and retrieval by the adaptive QoS module 218.

The examples of the technology described and illustrated herein may be embodied as one or more non-transitory computer readable media having machine or processor-executable instructions stored thereon for one or more aspects of the present technology, which when executed by the processor(s) 200, cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3-6, for example.

Figure 3:
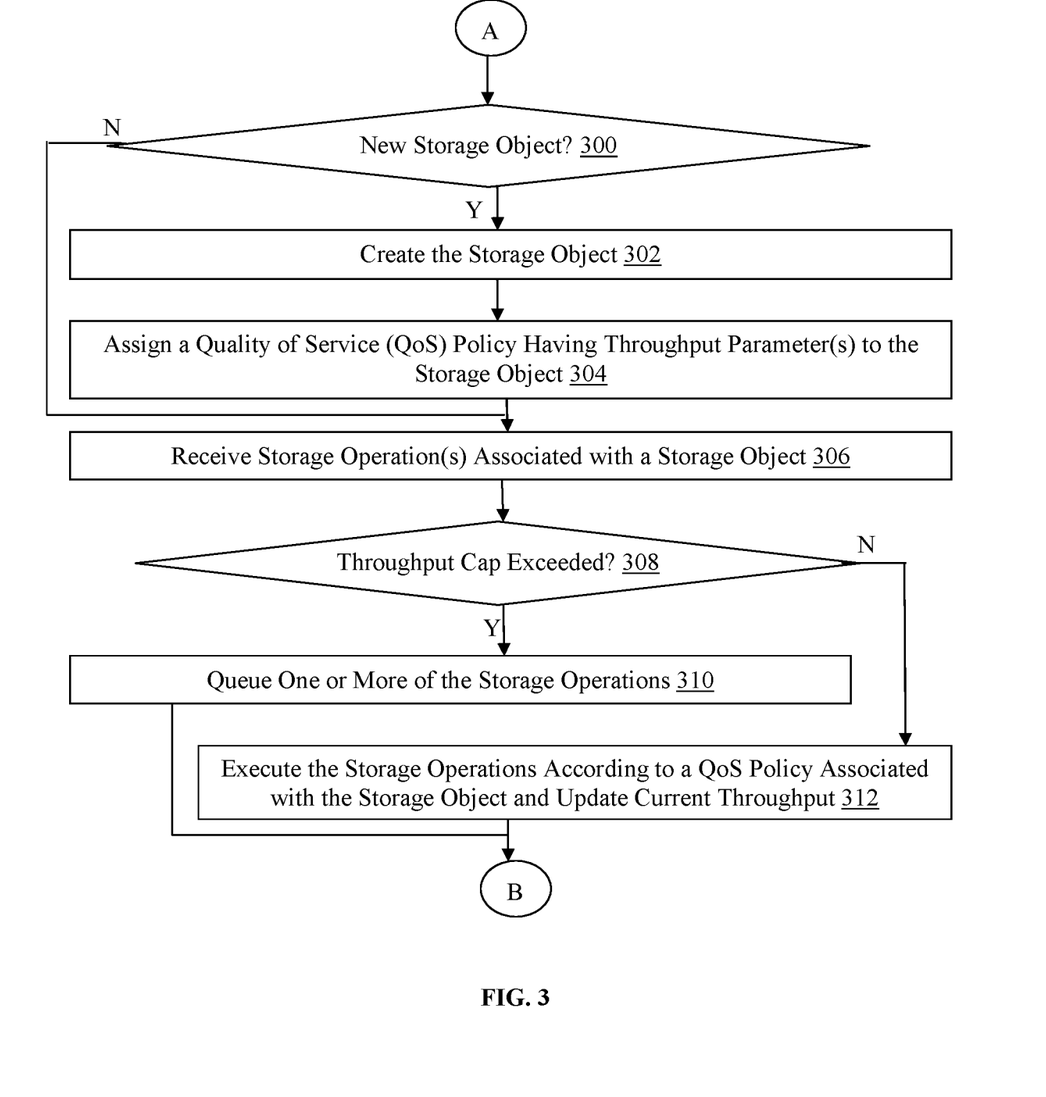
FIG. 3 is a flowchart of an exemplary method for instantiating storage objects and processing storage operations.

Referring more specifically to FIG. 3, a flow diagram illustrating an exemplary method for instantiating storage objects and processing storage operations is illustrated. In step 300 in this example, the node computing device 106(1) determines whether a request to create a new storage object is received. The request can be received from an administrator or can be the result of an automated process, for example. The requested storage object can be a volume, a LUN, a file, or an NVMe namespace, for example, although other storage objects can also be requested in other examples. While the examples described and illustrated herein with reference to the node computing device 106(1), these examples also can be implemented by any of the node computing devices 106(1)-106(n). Accordingly, if the node computing device 106(1) determines that a request to create a new storage object is received in step 300, then the Yes branch is taken to step 302.

In step 302, the node computing device 106(1) creates or instantiates the storage object identified in the storage request received in step 300. In one example, the node computing device 106(1) can create the volume 118(1) on the data storage device 110(1), although another type of storage object can also be created.

In step 304, the node computing device 106(1) assigns one of the QoS policies 220 to the created storage object. The one of the QoS policies 220 in this example includes throughput parameter(s), such as a number of IOPS that will be provided to storage operations associated with the storage object, although other types and/or numbers of parameters may be used. The number of IOPS can be defined as a minimum number of IOPS and/or a maximum number of IOPS, for example, thereby defining a range of performance that will be provided for the storage object. In some examples, the number of IOPS can be based on a storage operation block size, thereby defining a particular throughput and advantageously providing equivalent performance (e.g., IOPS) for different I/O or storage operation block size. Other types of throughput and other parameters can also be defined in the one of the QoS policies 220 in other examples.

Additionally, in some examples, the one of the QoS policies 220 can be assigned to the created storage object along with a plurality of other storage objects of the same type that collectively comprise a performance tier, which can be associated with one or more applications, for example. In these examples, the applications can utilize the storage objects with a guaranteed QoS performance associated with the performance tier of storage objects.

In yet other examples, the QoS policy assigned to the created storage object can be a custom QoS policy instead of a previously-stored one of the QoS policies 220. The custom QoS policy can be generated via a provided administrator interface and contemporaneous with the request for the new storage object, for example. Other methods of creating and/or assigning the QoS policy to the created storage object can also be used in other examples.

Subsequent to assigning the one of the QoS policies 220 in this example, or if the node computing device 106(1) determines in step 300 that a request to create a new storage object is not received in step 300 and the No branch is taken, then the node computing device 106(1) proceeds to step 306. In step 306, the node computing device 106(1) receives storage operation(s) associated with or directed to a storage object, such as from one or more of the client devices 108(1)-108(n) or from a stored queue, for example. The storage operations can be associated with data stored on the volume 118(1) in this example.

In step 308, the node computing device 106(1) optionally determines whether a throughput cap for the storage object is exceeded. The throughput cap can be at least part of the throughput parameter(s) defined in one of the QoS policies 220 associated with the storage object, and can be a maximum number of IOPS for a particular I/O or storage operation block size, for example. In some examples, the throughput cap corresponds with a burst or peak throughput defined for the storage object, although other types of throughput caps can be used. Accordingly, the node computing device 106(1) can maintain a current throughput for storage object(s), as described and illustrated in more detail later. If the node computing device 106(1) determines that the throughput cap has been exceeded for the storage object associated with the received storage operation(s), then the Yes branch is taken to step 310.

In step 310, the node computing device 106(1) queues one or more of the storage operation(s) in the memory 202. By queuing the storage operation(s), the node computing devices 106(1) restricts the performance provided to the storage object according to the maximum throughput indicated in the associated one of the QoS policies 220. Referring back to step 308, if the node computing device 106(1) determines that the throughput cap has not been exceeded for the storage object, then the No branch is taken to step 312.

In step 312, the node computing device 106(1) executes the received storage operation(s) according to one of the QoS policies 220 associated with the storage object and updates a stored current throughput for the storage object. Accordingly, in this example the node computing device 106(1) monitored the performance of storage operation(s) executed with respect to particular storage object(s) and stored the current throughput to ensure appropriate QoS policy enforcement.

Figure 4:
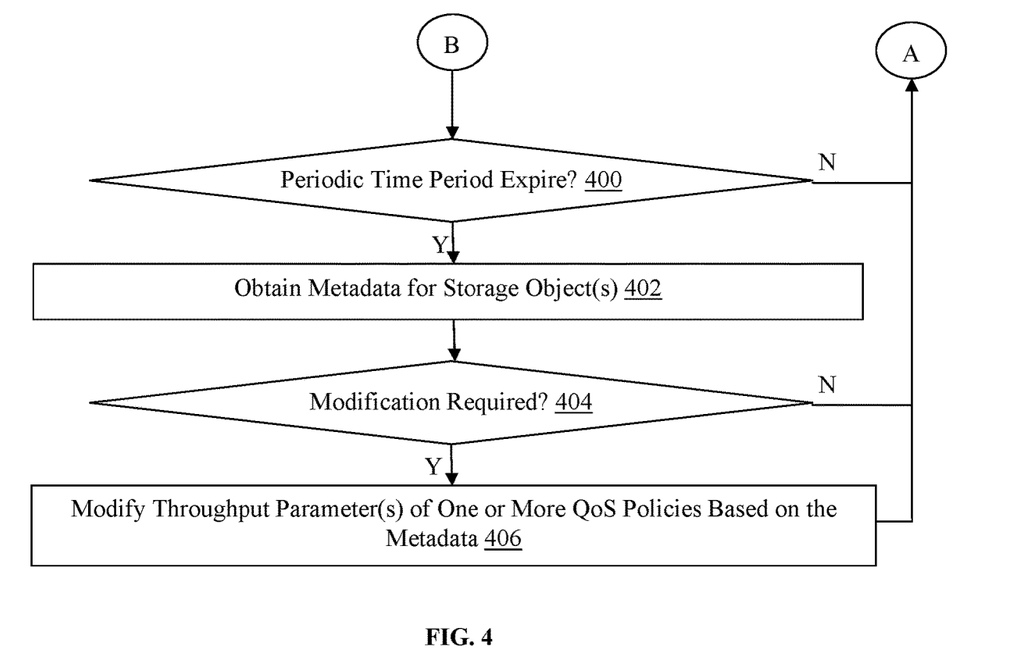
FIG. 4 is a flowchart of an exemplary method for implementing adaptive quality of service (QoS) in a storage network.

Referring more specifically to FIG. 4, a flow diagram illustrating an exemplary method for implementing adaptive QoS in a storage network is illustrated. Subsequent to queuing the storage operation(s) in step 310 of FIG. 3 or executing the storage operations in step 312 of FIG. 3 in this example, the node computing device 106(1) proceeds to step 400.

In step 400, the node computing device 106(1) (e.g., a background thread executed thereon) optionally determines whether a periodic time period has expired, although other time intervals may be used. In this example, the node computing device 106(1) periodically analyzes each of the QoS policies 220 to determine whether a modification of parameter(s) included therein is required, although in other examples the analysis can be performed at other times or based on other factors. If the node computing device 106(1) determines in this example that the periodic time period has not expired, then the No branch is taken back to step 300 of FIG. 3. However, if the node computing device 106(1) determines that the periodic time period has expired, then the Yes branch is taken to step 402.

In step 402, the node computing device 106(1) obtains a portion of the storage object metadata 222 associated with each of one or more storage objects. In this example, the node computing device 106(1) periodically monitors the metadata which includes at least a size attribute of each of the storage objects. The size attribute can correspond to a utilization of the storage object (e.g., by one or more associated applications hosted by the one or more of the client devices 108(1)-108(n)) or an allocated capacity of the storage object.

In step 404, the node computing device 106(1) determines whether one or more of the QoS policies 220 associated with one or more of the storage objects require modification based on the metadata obtained in step 402. The determination in step 404 can be based on one or more rules stored within one or more of the QoS policies 220 or external to one or more of the QoS policies 220, for example. If the node computing device 106(1) determines that none of the QoS policies 220 requires modification, then the No branch is taken back to step 300 of FIG. 3. However, if the node computing device 106(1) determines that at least one of the QoS policies 220 requires modification, then the Yes branch is taken to step 406.

In step 406, the node computing device 106(1) automatically modifies one or more of the QoS policies 220 to adjust one or more of the throughput parameters included therein based on the size attributes of the corresponding storage object(s) in the metadata obtained in step 402. Accordingly, the node computing device 106(1) in this example modifies one or more of the QoS policies 220 to alter the performance provided with respect to particular storage object(s) associated with the one or more of the QoS policies 220 in response to changes in utilization or capacity, for example, of the storage object(s).

In one particular example, an exemplary rule can require increasing a throughput parameter in one of the QoS policies 220 associated with the volume 118(1) to provide more IOPS for a specified storage operation block size when the size attribute in the metadata for the volume 118(1) indicates that a utilization or used space of the volume 118(1) has increased beyond a threshold. Other types of rules can be applied and other QoS policy modifications can also be implemented in other examples. Subsequent to modifying the one or more of the QoS policies 220, the node computing device 106(1) proceeds back to step 300 of FIG. 3 in this example. One or more of steps 300-312 or 400-406 can be performed in a different order or in parallel in other examples.

As described and illustrated herein, this technology advantageously configures, manages, and scales performance, such as throughput, provided to storage objects based on a used or allocated size of the storage objects that is monitored over time. Accordingly, this technology advantageously provides more performance for applications as storage object space is increasingly consumed by the applications, thereby improving the functionality and efficiency of storage nodes or controllers that are executing storage operations and managing I/O in storage networks. This technology also facilitates improved and adaptive performance tiering for providers of storage as a service to more effectively align application requirements with storage network performance.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
    assigning, by a computing device, a first quality of service (QoS) policy to a first storage object, the assigned first QoS policy comprising a first throughput parameter comprising a number of input/output (I/O) operations per second (IOPS) based on a storage operation block size;
    executing, by the computing device, storage operations with the first storage object according to the first throughput parameter;
    monitoring, by the computing device, a space utilization of the first storage object; and
    automatically modifying, by the computing device, the first QoS policy to adjust the first throughput parameter based on the space utilization of the first storage object.

2. The method of claim 1, further comprising automatically modifying, by the computing device, a second QoS policy assigned to a second storage object to adjust a second throughput parameter of the second QoS policy based on an allocated capacity of the second storage object.

3. The method of claim 1, wherein the number of IOPS comprises a maximum number of IOPS and the method further comprises queuing, by the computing device, another one or more received storage operations, when the maximum number of IOPS is reached.

4. The method of claim 3, wherein the maximum number of IOPS of the assigned first QoS policy is dynamic based on device performance.

5. The method of claim 1, wherein the first storage object comprises a volume, a logical unit number (LUN), a file, or a non-volatile memory express (NVMe) namespace.

6. The method of claim 1, further comprising assigning, by the computing device, the first QoS policy to a plurality of storage objects including the first storage object, wherein each of the storage objects is a same type of storage object and the storage objects collectively comprise a performance tier associated with an application.

7. A non-transitory machine readable medium having stored thereon instructions for managing quality of service (QoS) in a storage network comprising machine executable code which when executed by at least one machine causes the machine to:
    assign a first quality of service (QoS) policy to a first storage object, the assigned first QoS policy comprising a first throughput parameter comprising a number of input/output (I/O) operations per second (IOPS) based on a storage operation block size;

execute storage operations with the first storage object according to the first throughput parameter;
monitor a space utilization of the first storage object; and
automatically modify the first QoS policy to adjust the first throughput parameter based on the space utilization of the first storage object.

8. The non-transitory machine readable medium of claim 7, wherein the machine executable code when executed by the machine further causes the machine to automatically modify a second QoS policy assigned to a second storage object to adjust a second throughput parameter of the second QoS policy based on an allocated capacity of the second storage object.

9. The non-transitory machine readable medium of claim 7, wherein the number of IOPS comprises a maximum number of IOPS and the machine executable code when executed by the machine further causes the machine to queue another one or more received storage operations, when the maximum number of IOPS is reached.

10. The non-transitory machine readable medium of claim 9, wherein the maximum number of IOPS of the assigned first QoS policy is dynamic based on device performance.

11. The non-transitory machine readable medium of claim 7, wherein the storage object comprises a volume, a logical unit number (LUN), a file, or a non-volatile memory express (NVMe) namespace.

12. The non-transitory machine readable medium of claim 7, wherein the machine executable code when executed by the machine further causes the machine to assign the first QoS policy to a plurality of storage objects including the first storage object, wherein each of the storage objects is a same type of storage object and the storage objects collectively comprise a performance tier associated with an application.

13. A computing device, comprising:
a memory containing machine readable medium comprising machine executable code having stored thereon instructions for managing quality of service (QoS) in a storage network; and
a processor coupled to the memory, the processor configured to execute the machine executable code to cause the processor to:
assign a first quality of service (QoS) policy to a first storage object, the assigned first QoS policy comprising a first throughput parameter comprising a number of input/output (I/O) operations per second (IOPS) based on a storage operation block size;
execute storage operations with the first storage object according to the first throughput parameter;
monitor a space utilization of the first storage object; and
automatically modify the first QoS policy to adjust the first throughput parameter based on the space utilization of the first storage object.

14. The computing device of claim 13, wherein the processor is further configured to execute the machine executable code to further cause the processor to automatically modify a second QoS policy assigned to a second storage object to adjust a second throughput parameter of the second QoS policy based on an allocated capacity of the second storage object.

15. The computing device of claim 13, wherein the number of IOPS comprises a maximum number of IOPS and the processor is further configured to execute the machine executable code to further cause the processor to queue another one or more received storage operations, when the maximum number of IOPS is reached.

16. The computing device of claim 15, wherein the maximum number of IOPS of the assigned first QoS policy is dynamic based on device performance.

17. The computing device of claim 13, wherein the storage object comprises a volume, a logical unit number (LUN), a file, or a non-volatile memory express (NVMe) namespace.

18. The computing device of claim 13, wherein the processor is further configured to execute the machine executable code to further cause the processor to assign the first QoS policy to a plurality of storage objects including the first storage object.

19. The computing device of claim 18, wherein each of the storage objects is a same type of storage object and the storage objects collectively comprise a performance tier associated with an application.

20. The computing device of claim 14, wherein the allocated capacity corresponds to an amount of space allocated to the storage object and the space utilization corresponds to a proportion of the space allocated to the storage object that is used.

* * * * *